US007454299B2

(12) United States Patent
Bolz

(10) Patent No.: US 7,454,299 B2
(45) Date of Patent: Nov. 18, 2008

(54) DEVICE AND METHOD FOR DETECTING AN END OF A MOVEMENT OF A VALVE PISTON IN A VALVE

(75) Inventor: Stephan Bolz, Pfatter (DE)

(73) Assignee: Siemens Aktiengesellschaft, Munich (DE)

( * ) Notice: Subject to any disclaimer, the term of this patent is extended or adjusted under 35 U.S.C. 154(b) by 229 days.

(21) Appl. No.: 11/523,993

(22) Filed: Sep. 20, 2006

(65) Prior Publication Data

US 2007/0067127 A1 Mar. 22, 2007

(30) Foreign Application Priority Data

Sep. 20, 2005 (DE) ...................... 10 2005 044 886

(51) Int. Cl.
*F16K 31/02* (2006.01)
*H01F 21/06* (2006.01)
*G06F 19/00* (2006.01)

(52) U.S. Cl. ............... 702/64; 251/129.09; 251/129.15; 251/318; 251/319; 336/130; 336/131; 702/1; 702/57; 702/127; 702/150; 702/189

(58) Field of Classification Search .................. 251/61, 251/129.01, 129.09, 129.15, 129.2, 318, 251/319, 324, 325; 336/45, 130, 131; 702/1, 702/57, 64, 65, 127, 150, 155, 158, 189
See application file for complete search history.

(56) References Cited

U.S. PATENT DOCUMENTS

| | | | | |
|---|---|---|---|---|
| 6,208,497 | B1 * | 3/2001 | Seale et al. | 361/160 |
| 6,942,469 | B2 * | 9/2005 | Seale et al. | 417/413.1 |
| 2001/0043450 | A1 * | 11/2001 | Seale et al. | 361/160 |
| 2006/0171091 | A1 * | 8/2006 | Seale et al. | 361/160 |
| 2007/0067127 | A1 * | 3/2007 | Bolz | 702/94 |
| 2007/0090315 | A1 * | 4/2007 | Bolz | 251/129.04 |

* cited by examiner

*Primary Examiner*—Edward R Cosimano
(74) *Attorney, Agent, or Firm*—Laurence A. Greenberg; Werner H. Stemer; Ralph E. Locher

(57) ABSTRACT

A device is embodied for detecting a first variable that is representative of an induced voltage induced by a movement of a valve piston in the coil of a valve. The device is further embodied for determining a second variable representative of a first derivation of a first variable according to time. Furthermore the device is embodied for detecting the end of the movement of the valve piston in the valve if the first variable is greater than a predetermined first threshold value and the second variable drops be low a predetermined second threshold value.

19 Claims, 5 Drawing Sheets

DEVICE AND METHOD FOR DETECTING AN END OF A MOVEMENT OF A VALVE PISTON IN A VALVE

CROSS-REFERENCE TO RELATED APPLICATION

This application claims the priority, under 35 U.S.C. §119, of German application DE 10 2005 044 886.0, filed Sep. 20, 2005; the prior application is herewith incorporated by reference in its entirety.

BACKGROUND OF THE INVENTION

Field of the Invention

The invention relates to a device and a corresponding method for detecting the end of a movement of a valve piston in a valve, in particular in a magnetically bi-stable solenoid valve for an injection valve of an internal combustion engine in a motor vehicle.

High requirements are placed on internal combustion engines, in particular in motor vehicles. The pollutant emissions are subject to statutory provisions and the customer demands low fuel consumption and a safe and reliable operation. The fuel mixture preparation can be improved by direct injections of the fuel into the respective combustion chamber of the internal combustion engine at high pressure, e.g. at over 2,000 bar in the case of diesel fuel or at over 100 bar in the case of gasoline, as well as, where appropriate, by delivering the fuel in a plurality of partial injections per injection cycle, thereby reducing the fuel consumption and the generation of pollutant emissions. The requirements in terms of the precision and dynamics of the injection valves are therefore high. For example, valve switching times of e.g. approximately 100 to 500 microseconds are required so that at the high fuel pressure small amounts of fuel, e.g. a few micrograms can be precisely injected. For diesel passenger car engines, the injection valves have for this purpose a piezoactuator for actuating the valve. However, injection valves with a piezoactuator are expensive. On the other hand, injection valves that have a magnetic actuator do not achieve the required valve switching times.

For large-volume and slow-running diesel truck engines, for example a six-cylinder engine with a nine-liter cubic capacity and an operating speed of maximum 1,800 revolutions per minute, the requirement placed on the valve switching times is less. In order to be able to precisely meter a predetermined amount of fuel, a period of time during which the valve is open and the valve switching time must be known as precisely as possible.

SUMMARY OF THE INVENTION

It is accordingly an object of the invention to provide a device and a method for detecting an end of a movement of a valve piston in a valve which overcome the above-mentioned disadvantages of the prior art methods and devices of this general type, and which are reliable.

The invention is characterized by a device and a corresponding method for detecting in each case an end of a movement of a valve piston in at least one valve. The device can be coupled to the at least one valve. The device is embodied to record a first variable that is representative of an induced voltage that is induced by the movement of the valve piston in a coil of the valve. The device is also embodied to determine a second variable that is representative of a first derivation of the first variable according to time. The device is further embodied to detect the end of the movement of the valve piston in the valve if the first variable is greater than a predefined first threshold value and the second variable falls below a predefined second threshold value.

By taking into account both the first variable and the second variable it is possible to perform the detection with particular reliability. If the first variable is greater than the predefined first threshold value, it can thereby be ensured that the induced voltage is sufficiently high and that, more particularly, the induced voltage is greater than any noise or other interference signals that may be present. Due to the end of the movement of the valve piston the induced voltage has a characteristic profile, in particular a bend, after which the induced voltage drops faster compared to its previous waveform. If the second variable falls below the predefined second threshold value, this characteristic profile of the induced voltage at the end of the movement of the valve piston can be reliably detected. The device is embodied, for example, for generating a signal in order to signal the detection of the end of the valve piston in the valve.

In an advantageous embodiment of the invention, the predefined first threshold value and/or the predefined second threshold value is specified as a function of the first variable. This has the advantage that the end of the movement of the valve piston can be reliably detected at different sizes of induced voltage. The induced voltage is different in size, for example, for different valves or for different states of wear of the at least one valve.

In this connection it is advantageous if the predefined first threshold value or the predefined second threshold value is only specified as a function of the first variable if the first variable is greater than a predefined third threshold value. The predefined third threshold value is preferably so large that it is not exceeded by noise or other interference signals present in the first variable. Moreover, the predefined third threshold value is preferably so small that the end of the movement of the valve piston can be reliably detected even in the case of a small induced voltage. In this way the detection of the end of the movement of the valve piston can be robust against noise and other interference signals and against different levels of induced voltage.

In a further advantageous embodiment of the invention, the device contains a first impedance converter whose input impedance is greater than its output impedance and to which the induced voltage can be supplied on the input side. The device also contains a second impedance converter whose input impedance is less than its output impedance and which is coupled on the output side to an output of the first impedance converter via a series circuit formed of a resistor and a capacitor. The first variable can be recorded on the output side of the first impedance converter. The second variable can also be determined on the output side of the second impedance converter. The advantage is that a device of this type can be very simple and inexpensive. The first and the second impedance converter can be formed, for example, by at least one transistor in each case. A device of this type can also be embodied very easily and particularly cheaply as an integrated circuit.

In a further advantageous embodiment of the invention, a low-pass filter is provided on the input side. This has the advantage that noise and high-frequency interferences can be reduced, thereby enabling the detection of the end of the movement of the valve piston to be accomplished particularly reliably.

In a further advantageous embodiment of the invention, the device has a voltage divider which is disposed electrically between a supply potential and a ground potential and which is embodied as a series circuit formed of at least three resistors and at which the predefined first threshold value and the predefined second threshold value can be tapped off in each case between two succeeding resistors. The advantage is that the predefined first threshold value and the predefined second threshold value can be specified very easily and precisely by a multistage voltage divider of this type and only a few components are required for this purpose.

In a further advantageous embodiment of the invention, the device includes on the output side a first and a second comparator, each of which has an open-collector output. The device is embodied in such a way that the first comparator is supplied at its non-inverting input with the first variable and at its inverting input with the predefined first threshold value. The second comparator is supplied at its inverting input with the second variable and at its non-inverting input with the predefined second threshold value. The open-collector output of the first comparator and the open-collector output of the second comparator are interconnected and form an output of the device. The advantage is that only a few components are required and consequently the device is very simple.

In a further advantageous embodiment of the invention, the device has on the input side, a protective circuit which is formed of at least one diode and one resistor and which is embodied in such a way that if a supply voltage is exceeded on the input side the diode becomes conductive and the flow of current through the diode is limited by the resistor. This makes the device robust and simple and reliably protects the device against an overvoltage on the input side.

Other features which are considered as characteristic for the invention are set forth in the appended claims.

Although the invention is illustrated and described herein as embodied in a device and a method for detecting an end of a movement of a valve piston in a valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
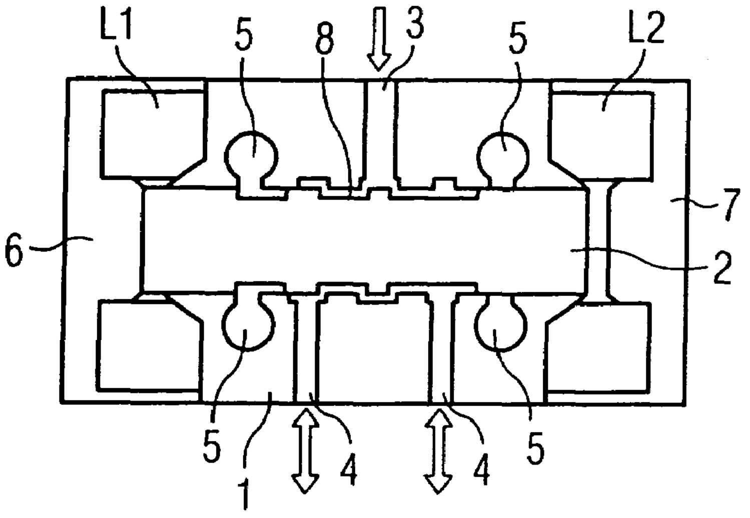
FIG. 1 is a diagrammatic illustration of a valve.

Components and elements that correspond to one another are denoted by the same designations throughout the figures. Referring now to the figures of the drawing in detail and first, particularly, to FIG. 1 thereof, there is shown a valve, e.g. a control valve for an injection valve for an internal combustion engine in a motor vehicle. The valve contains a valve housing 1 that has a recess in which a valve piston 2 is disposed so that it can move axially. The valve has an inlet 3 and two outlets 4 formed in the valve housing 1. Furthermore, drains 5 are formed in the valve housing 1. The inlet 3 can, for example, be connected to a non-illustrated fluid reservoir from which a fluid such as hydraulic oil or engine oil can be supplied to the valve. The outlets 4 terminate, for example, in a non-illustrated control space with, for example, an adjacent hydraulic plunger that moves in the control space relative to fluid pressure, to open and close the injection valve.

Depending on an axial position of the valve piston 2 in the recess in the valve housing 1, either the inlet 3 is hydraulically connected via channels 8, formed in the valve piston 2 and the valve housing 1, to the outlet 4 or the outlets 4 are connected to the drains 5. The fluid can flow out from the control space through the drains 5.

The valve has a first cap 6 and a second cap 7 each of which is disposed at an axial end of the valve. The first valve 6 and the second valve 7 limit the stroke of the valve piston 2 in the valve housing 1. Adjoining the first cap 6 is a first coil L1 and adjoining the second cap 7 is a second coil L2. By suitably energizing the first coil L1 or the second coil L2, a magnetic field can be established causing the valve piston 2 to be pulled through the field and moved against the stroke stop formed by the first cap 6 or second cap 7. The first cap 6 and second cap 7 are preferably embodied in such a way that even after the energizing of the first coil L1 or of the second coil L2 has ended a remnant magnetic field remains due to a corresponding magnetization of the first cap 6 or second cap 7. The valve piston 2 can thus retain its current position at the first cap 6 or second cap 7 until the valve piston 2 is pulled to the opposite cap by the energization of the corresponding coil. The valve thus forms a magnetic bi-stable solenoid valve. The valve can, however, also have a different embodiment.

Figure 2:
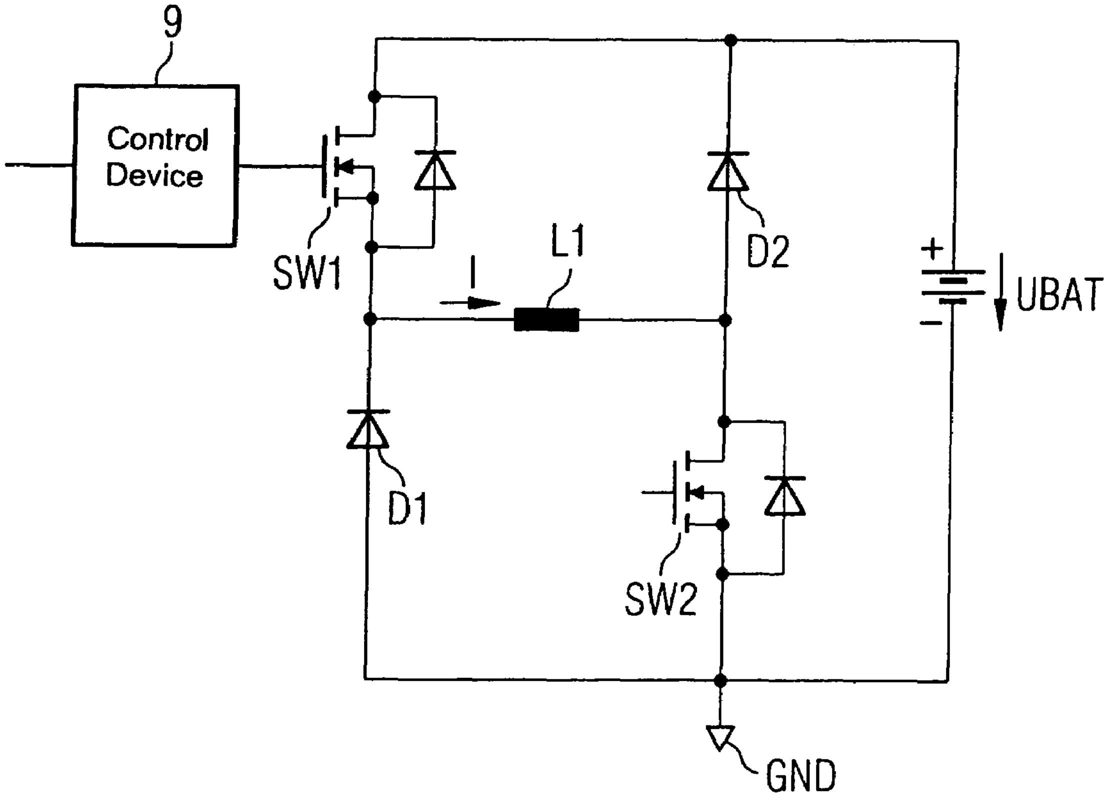
FIG. 2 is a schematic diagram of a circuit configuration for controlling the valve according to the invention.

FIG. 2 shows a circuit configuration that is embodied for the control of the valve. The circuit configuration has a control device 9 that, for example, generates a pulse width modulated control signal that is applied to a first switch SW1. The first switch SW1 is electrically connected between a positive potential of a battery voltage UBAT and a first terminal of the first coil L1. The battery voltage UBAT is for example, approximately 24 volts. Furthermore, the first switch SW1 and the first terminal of the first coil L1 are connected through a first diode D1, disposed in the reverse direction, to a negative potential of the battery voltage UBAT, designated as a ground potential GND.

A second terminal of the first coil L1 is connected via a second switch S2 to the ground potential GND. The second switch SW2 is provided for selecting the valve if other valves can be controlled by the control device 9. Furthermore, the second terminal of the first coil L1 is connected through a second diode D2, disposed in the reverse direction, to the positive potential of the battery voltage UBAT. The first switch SW1, the second switch SW2, the first diode D1 and the second diode D2 are accordingly provided for the second coil L2. The control device 9 is preferably also appropriately embodied to generate the pulse width modulated control signal for the second coil L2.

The first coil L1 and the second coil L2 are preferably energized alternately so that the valve piston 2 is moved in the other axial direction in each case to the first cap 6 or second cap 7 as appropriate. Preferably, the coil that is not energized is used to detect the movement of the valve piston 2 in the valve housing 1. Because the first cap 6 and the second cap 7 or the valve housing 1 or the valve piston 2 are magnetized, an induced voltage can be created in the first coil L1 and in the second coil L2 due to the movement of the valve piston 2 through the dominant magnetic field. The induced voltage is particularly easy to detect in the coil that is not energized.

Figure 3:
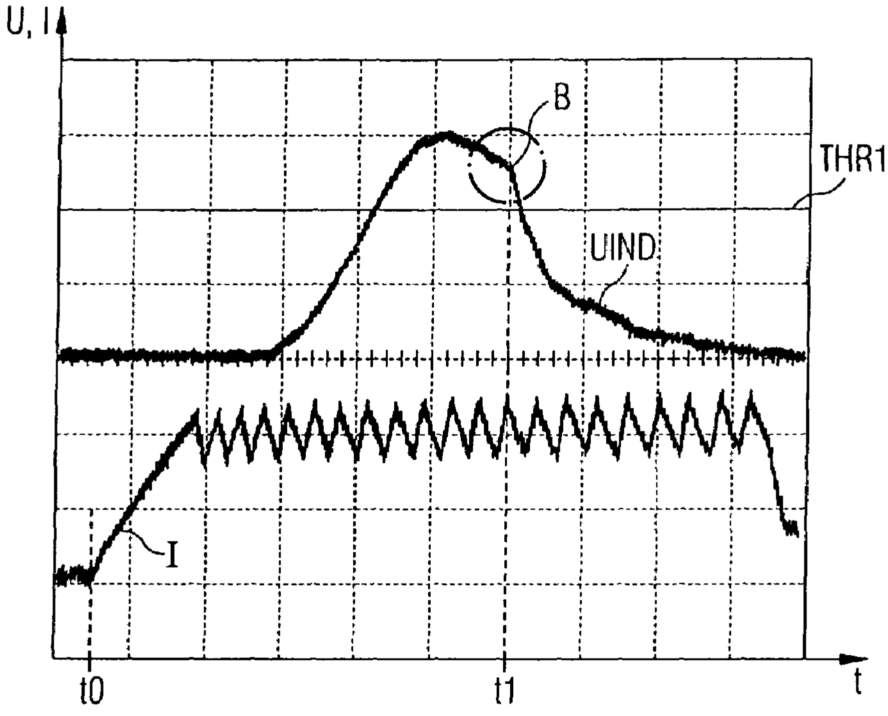
FIG. 3 is a first diagram.

FIG. 3 shows the first diagram in which a profile of an electric current I when the first coil L1 or second coil L2 is energized. The energizing of the particular coil begins at a start time point t0 when the first switch SW1 or second switch SW2 assigned to the particular coil is closed. The electric current I increases until a predetermined current is reached. The current I is then held within a predetermined range by alternately closing and opening the first switch SW1. The induced voltage is induced by the dominant magnetic field in the particular unenergized coil at the start of the movement of the valve piston. This can be detected in the form of a first variable UIND that is representative of the induced voltage. If the valve piston 2 reaches the stroke stop, formed by the first cap 6 or second cap 7, at a first time point t1, the first variable UIND then shows a characteristic profile in the form of a kink B. The kink B is caused by the end of the movement of the valve piston. Because the induced voltage is not further induced after the first time point t1, the first variable UIND falls faster after time point t1 than before the first time point t1. The end of the movement of the valve piston can thus be detected by detecting the kink B in the profile of the first variable UIND.

Figure 4:
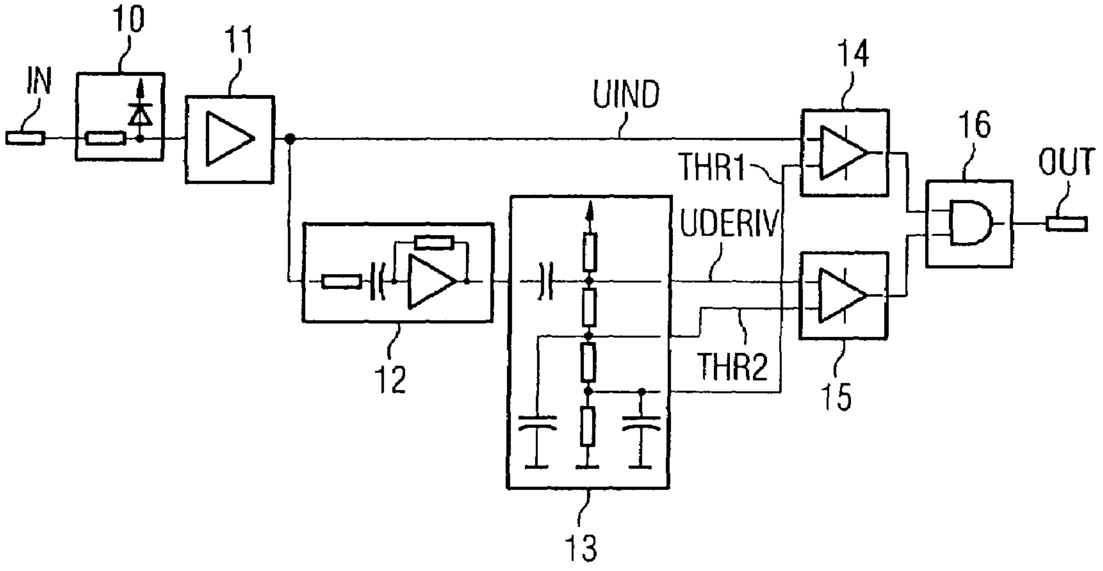
FIG. 4 is a block diagram of a device for detecting the end of a movement of a valve piston in the valve according to the invention.

FIG. 4 shows a block diagram of a device for detecting the end of the movement of the valve piston in the valve. The device has an input IN through which the induced voltage or the first variable UIND can be applied to the device. A protective circuit 10 is provided at the input side of the device to protect the device from excessive input voltage at the input IN and thus prevent damage to the device. The protective circuit 10 is connected to a buffer 11, for example embodied as a first impedance converter. The device can thus, for example, have a high-resistance connection to the first coil L1 or second coil L2 or further coils in any further valves provided. The first variable UIND can be tapped off at an output of the buffer 11.

The buffer 11 is connected to a derivative-action element 12 that forms a first derivation of a first variable UIND as a function of time and outputs a second variable UDERIV that is representative of the first derivation of the first variable UIND as a function of time. Furthermore, a reference generator 13 is provided in the device that generates and inputs a predetermined first threshold value THR1 and a predetermined second threshold value THR2.

Figure 5:
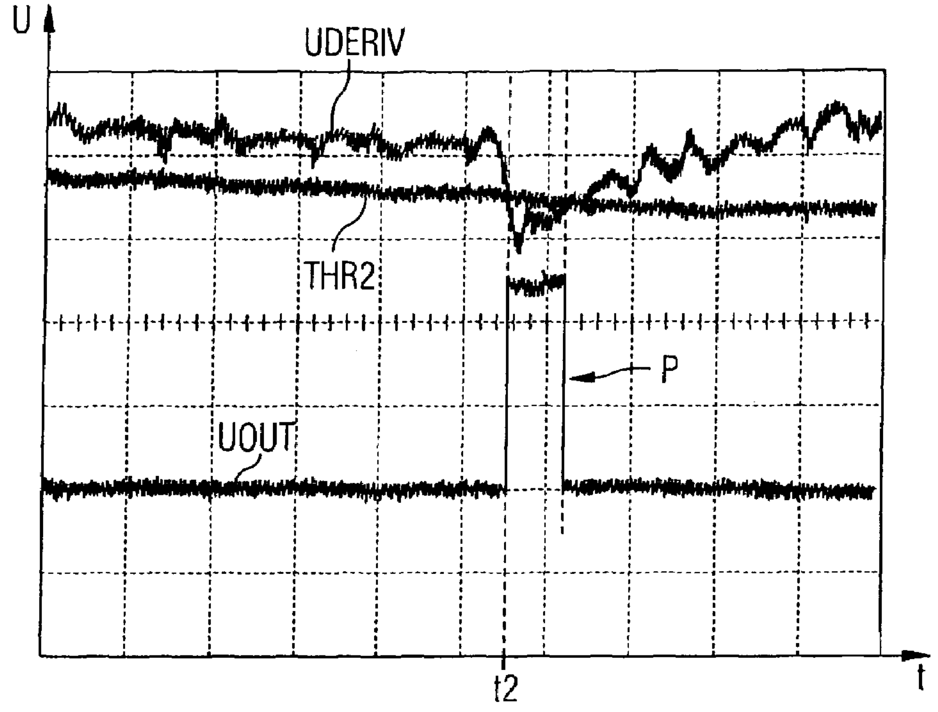
FIG. 5 is a second diagram.

A first comparator 14 is provided for comparing the first variable UIND with the predetermined first threshold value THR1. A second comparator 15 is provided for comparing the second variable UDERIV with the predetermined second threshold value THR2. At an output end, the first comparative 14 and the second comparator 15 undergo a logic operation in an AND element 16. An output OUT of the device is formed by an output of the AND element 16. The detection of the end of the movement of the valve piston is signaled at an output OUT when the first variable UIND is greater than the predetermined first threshold value THR1 and the second variable UDERIV falls below the predetermined threshold value THR2 (FIG. 5). The signaling at the output OUT is, for example, achieved by an output pulse P of an output voltage UOUT.

The output pulse P can, for example, be applied to a non-illustrated control unit that is embodied so as to trigger the valve relative to the second time point t2, marked by the output pulse P, in such a way that, for example, a predetermined amount of fuel is injected. A method corresponding to the block diagram can, however, also be provided in the form of a program implemented by the control unit.

FIG. 5 shows the profile of the second variable UDERIV of the predetermined second threshold value THR2 and of the output voltage UOUT. At the second time point t2, the second variable UDERIV falls below the predetermined second threshold value THR2 and triggers the output pulse P in the output voltage UOUT if the first variable UIND is at the same time greater than the predetermined first threshold value THR1 (FIG. 3).

Figure 6:
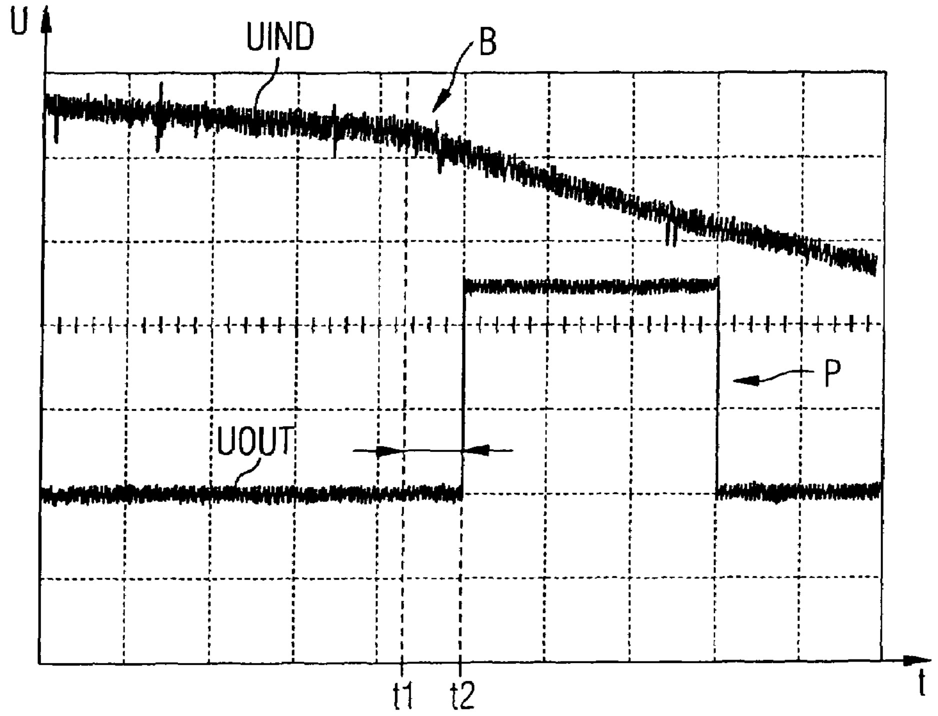
FIG. 6 is a third diagram.

Depending on the predetermined second threshold value THR2, the output pulse P, that occurs at the second time point t2, is delayed with respect to the occurrence of the kink B at the first time point t1 (FIG. 6). The device can, however, be embodied in such a way that this delay is largely constant and the first time point t1, i.e. the end of the movement of the valve body in the valve, can thus be reliably determined.

Figure 7:
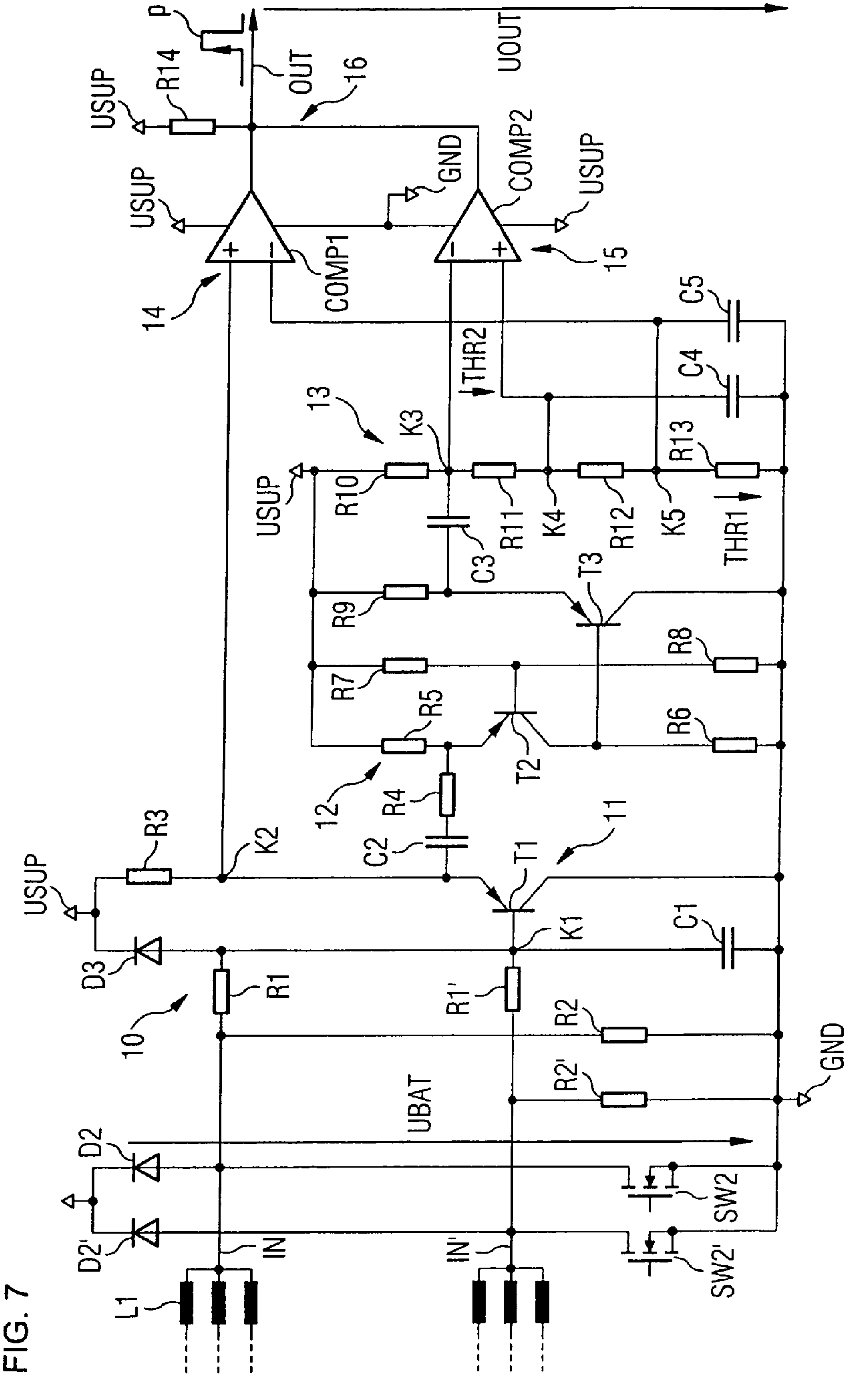
FIG. 7 is a schematic diagram of a first embodiment of the device.

FIG. 7 shows a first form of embodiment of the device. The device is embodied for detecting the respective end of the movement of the valve piston in six valves electrically connected to each other in two banks each formed of three valves. The valves are preferably sequentially activated and without an overlap in their activation. A device of this kind is preferably provided for the first coil L1 and for the second coil L2 respectively. If the valves are activated with an overlap, further devices are then to be provided as necessary. The elements of the device assigned to the second valve bank are given reference characters with an additional comma and in each case correspond to the elements assigned to the first valve bank. The device is explained in the following with reference to the first coil L1 shown in FIG. 2.

The input IN of the device is electrically connected to the second diode D2 and the second switch SW2. The input IN is also connected to a supply potential USUP, that for example is approximately 5 volts with respect to ground potential GND, via a first resistor R1 and a third diode D3 disposed in the reverse direction. The first resistor R1 and the third diode D3 are electrically connected to a node K1 that in turn is connected to a base terminal of a first transistor T1 and via a first capacitor C1 to the ground potential GND. The input IN is also connected through a second resistor R2 to the ground potential GND. The first coil L1 discharges via the second resistor R2. The exponential voltage drop after the first time point t1 is influenced by the second resistor R2. The first resistor R1, for example, has a resistance value of approximately 10K Ohm and the second resistor R2, for example, has a resistance value of approximately 500 Ohm.

The first resistor R1 and the third diode D3 form the protective circuit 10. If the voltage between the input IN and the ground potential GND is greater than the sum of the voltage between the supply potential USUP and the ground potential GND and a conducting-state voltage of the third diode D3, the third diode D3 then conducts. A current flow through the third diode D3 is then limited by the first resistor R1. The first resistor R1 together with resistors R1' and R2' form a voltage divider that reduces the voltage between the node K1 and ground potential GND with respect to the voltage between the input IN and the ground potential GND. This protects the device against an overvoltage at the input IN. Furthermore, a low-pass filter, that is preferably configured so as to largely suppress noise and other interfering signals at node K1, is formed by the first resistor R1 and the first capacitor C1.

The buffer 11 is formed by the first transistor T1 that is connected as a common collector. A collector terminal of the first transistor T1 is connected to the ground potential GND and an emitter terminal of the first transistor T1 is connected via a third resistor R3 to the supply potential USUP. The emitter terminal of the first transistor T1 forms a node K2 at which the first variable UIND is provided at low resistance. The common collector of the first transistor T1 has an input impedance that is greater than its output impedance. The first transistor T1 thus forms the first impedance converter.

The derivative-action element 12 is formed by a second capacitor C2 and a fourth resistor R4 that together form a series circuit, a second transistor T2 and a fifth, sixth, seventh and eighth resistor R5, R6, R7, R8 that serve for the operating point setting of the second transistor T2. The second transistor T2 is connected as a common base. An emitter terminal of the second transistor T2 is connected via the fifth resistor R5 to the supply potential USUP and a collector terminal of the second transistor T2 is connected via the sixth resistor R6 to the ground potential GND. Furthermore, a base terminal of the second transistor T2 is connected via the seventh resistor R7 to the supply potential USUP and via the eighth resistor R8 to the ground potential GND. The series circuit formed by the second capacitor C2 and the fourth resistor R4 is electrically connected between the second node K2 and the emitter terminal of the second transistor T2. By use of its common base, the second transistor T2 forms a second impedance converter with an input impedance that is less than its output impedance.

A critical frequency of the derivative-action element 12 is provided by $1/(2*\pi*R4*C2)$ and amounts for example to approximately 200 kHz. A voltage amplification of the second transistor T2 is provided by the ratio of the sixth resistor R6 to the fourth resistor R4.

The second variable UDERIV can be determined at the collector terminal of the second transistor T2. For this purpose, the collector terminal of the second transistor T2 is connected to a common base of a third transistor T3 that is connected in circuit as a common base. The third transistor T3 thus forms a third impedance converter with an input impedance greater than its output impedance. A collector terminal of the third transistor T3 is connected to the ground potential GND and an emitter terminal of the third transistor T3 is connected via a ninth resistor R9 to the supply potential USUP.

Electrically disposed between the supply potential USUP and the ground potential GND is a multistage voltage divider that forms the reference generator 13 and contains a series circuit made up of a tenth, eleventh, twelfth and thirteenth resistor R10, R11, R12, R13. The tenth resistor R10 is electrically disposed between the supply potential USUP and a node K3. The node K3 is connected via a third capacitor C3 to the emitter terminal of the third transistor T3. The eleventh resistor R11 is disposed between the third node K3 and a fourth node K4, and a twelfth resistor R12 is disposed between the fourth node K4 and a fifth node K5. The thirteenth resistor R13 is disposed between the fifth node K5 and ground potential GND. The second variable UDERIV can be tapped off at node K3. Node K4 is connected to ground potential GND via a fourth capacitor C4. The fifth node K5 is accordingly connected via a fifth capacitor C5 to the ground potential GND.

The predetermined first threshold voltage THR1 is tapped off at the fifth node K5, i.e., via the thirteenth resistor R13 or fifth capacitor C5. The predetermined first threshold value THR1 preferably has a value that is approximately half the size of the expected maximum amount of the first variable UIND. If, for example, the maximum amount corresponds to the supply potential USUP of 5 volts, then the predetermined first threshold voltage THR1 is preferably approximately 2.5 volts. The predetermined second threshold voltage THR2 is tapped off between the third node K3 and the fourth node K4, i.e. via the eleventh resistor R11. The predetermined first threshold value THR1 and the predetermined second threshold value THR2 are thus predetermined depending on the dimensioning of the voltage divider.

The device also includes a first comparator COMP1 and second comparator COMP2. The first comparator COMP1 is connected at the input end by its non-inverting input to the second node K2 and by its inverting input to the fifth node K5. The first comparator COMP1 thus forms a first comparator 14 that compares the first variable UIND with a predetermined first threshold value THR1. Accordingly, the second comparator COMP2 is connected by its inverting input to the third node K3 and by its non-inverting input to the fourth node K4. The second comparator COMP2 thus forms the second comparator 15 that compares the second variable UDERIV with the predetermined second threshold value THR2.

Preferably, the first comparator COMP1 and the second comparator COMP2 each have an open-collector output. In this way, the AND element 16 can be very easily realized by connecting the respective outputs of the first comparators COMP1 and second comparator COMP2. The combined open-collector outputs of the first comparator COMP1 and second comparator COMP2 thus form the output OUT of the device. The output OUT is connected via a fourteenth resistor R14 to the supply potential USUP.

If the kink B occurs in the profile of the first variable UIND, the potential at the third node K3 then drops. Because the potential at the fourth node K4 is supported by the charging of the fourth capacitor C4, the potential at the third node K3 can drop below the potential of the fourth node K4 for a brief period, e.g. a few tens of microseconds, and generate a positive pulse at the output of the second comparator COMP2, lasting approximately for the duration of the undershoot. If at the same time the potential of the second node K2 is greater than at the fifth node K5, the output pulse P is then generated at the output OUT.

The voltage divider formed of the tenth, eleventh, twelfth and thirteen resistors R10, R11, R12, R14 can also be formed from just three resistors provided the second variable UDERIV is tapped off at the emitter terminal of the third transistor T3 instead of at the third node K3 and the tenth and eleventh resistors R10, R11 are combined. The fourth and fifth capacitors C4, C5 can then be omitted.

Figure 8:
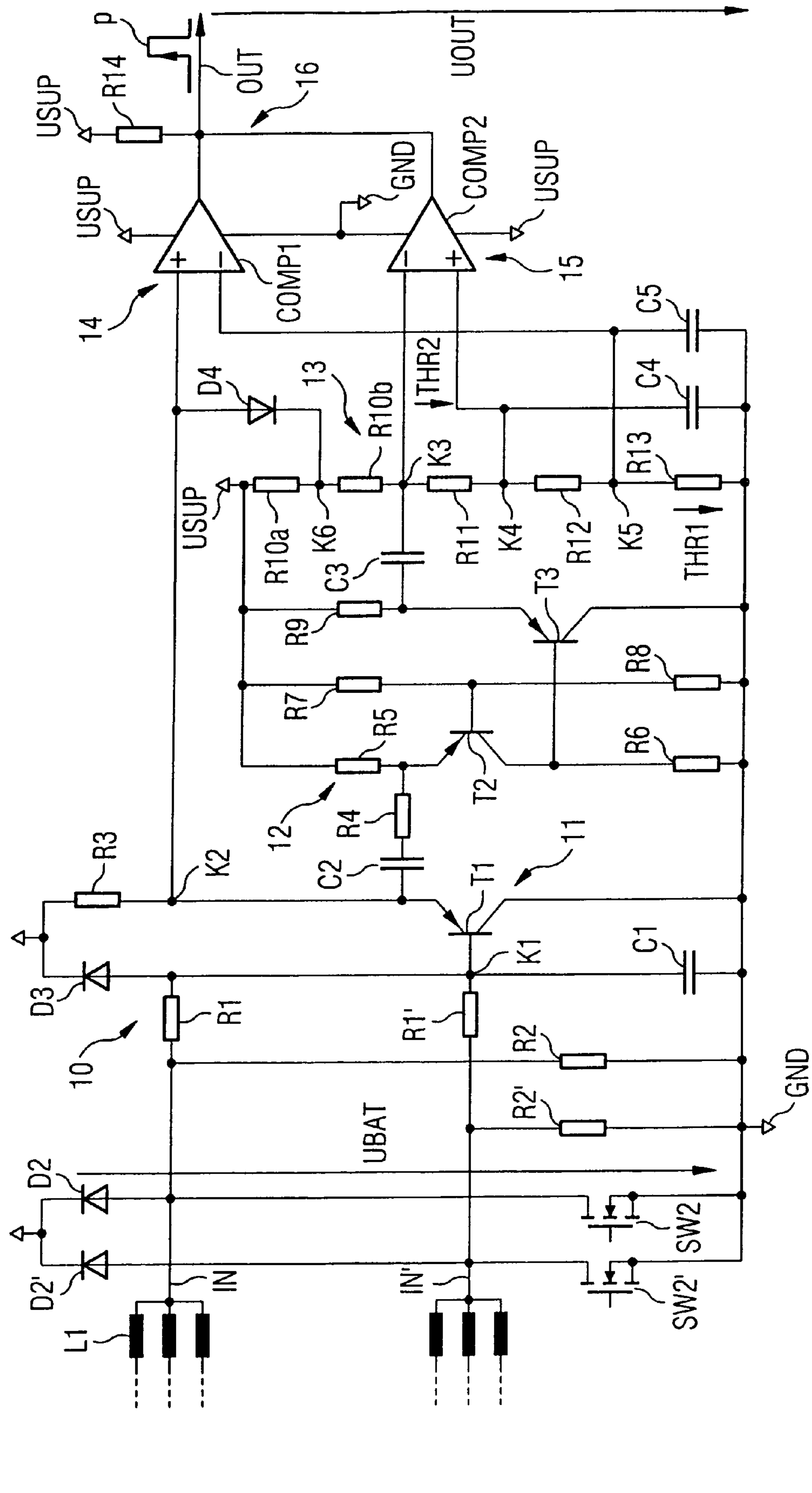
FIG. 8 is a schematic diagram of a second embodiment of the device.

FIG. 8 shows a second embodiment of the device that corresponds to the first embodiment shown in FIG. 7. However, the tenth resistor R10 is subdivided into a first sub-resistor R10*a* and a second sub-resistor R10*b*. A sixth node K6 is electrically formed between the first sub-resistor R10*a* and the second sub-resistor R10*b*. Furthermore, a fourth diode D4 is connected by its cathode terminal to the sixth node K6 and by its anode terminal to the second node K2. Therefore the potential at the sixth node K6 and also at the third node K3 and fourth node K4 are dependent on the potential at the second node K2 if the first variable UIND, i.e. the potential at the second node K2 is greater than a predetermined third threshold value. The predetermined threshold value is determined by a corresponding dimensioning of the first sub-resistor R10*a* and of the second sub-resistor R10*b*, of the eleventh resistor R11, of the twelfth resistor R12 and of the thirteenth resistor R13. Preferably, the third threshold value is predetermined so that this value is greater than any noise or other interference signals that may be present in the first variable UIND, but is sufficiently small so that the kink B in the profile of the first variable UIND can then be reliably detected even if the first variable UIND is only small. The advantage is that by varying the potential at the fourth node K4 relative to the potential at the second node K2 the predetermined second threshold value can be matched relative to the first variable UIND, because it is to be expected that the second variable UDERIV drops to a greater or lesser amount depending on the amount of the first variable UIND when the kink B occurs. In this way, the kink B can be reliably detected largely independent of the amount of the first variable UIND. Furthermore, with suitable dimensioning the delay between the first time point t1 of the occurrence of the kink B and the output pulse P at the second time point t2 can be largely constant. The end of the movement of the valve piston 2 can thus be determined with particular precision. The predetermined third threshold value for example amounts to approximately two to three volts.

I claim:

1. A device for detecting an end of a movement of a valve piston in at least one valve, comprising:

the device being connected to the least one valve and embodied for:

detecting a first variable being representative of an induced voltage induced by the movement of the valve piston in a coil of the valve;

determining a second variable being representative of a first derivation of the first variable according to time; and detecting the end of the movement of the valve piston in the valve if the first variable is greater than a predetermined first threshold value and the second variable falls below a predetermined second threshold value.

2. The device according to claim 1, further comprising:

a first impedance converter having an input impedance being greater than an output impedance, said first impedance converter having an output and an input for receiving the induced voltage; and a second impedance converter having an input impedance being less than an output impedance, said second impedance converter having an output, an input and a series circuit connected to said input, said series circuit containing a resistor and a capacitor, said input of said second impedance converter connected to said output of said first impedance converter, the first variable being detectable at said output of said first impedance converter and the second variable being detectable at said output of said second impedance converter.

3. The device according to claim 1, further comprising:

a device input; and a low-pass filter connected to said device input.

4. The device according to claim 1, further comprising a voltage divider electrically connected between a supply potential and a ground potential, said voltage divider having a series circuit containing at least three resistors and at which the predetermined first threshold value and predetermined second threshold value can be tapped off between two succeeding ones of said three resistors in each case.

5. The device according to claim 1, further comprising:

a device output;

a first and a second comparator, each of said first and second comparator having an open-collector output, an inverting input, and a non-inverting input, the first variable being applied to said non-inverting input of said first comparator, the predetermined first threshold value being applied to said inverting input of said first comparator, the second variable being applied to said inverting input of said second comparator and the predetermined second threshold value being applied to said non-inverting input of said second comparator, said open-collector output of said first comparator and said open-collector output of said second comparator are connected together and form said device output.

6. The device according to claim 1, further comprising:

a device input; and a protective circuit connected to said device input and including at least one diode and one resistor, said protective circuit embodied so that if an excessive supply voltage occurs at said device input said diode becomes conducting and a current flow through said diode is limited by said resistor.

7. The device according to claim 1, wherein the device is embodied such that the predetermined first threshold value and/or the predetermined second threshold value are determined in dependence on the first variable.

8. The device according to claim 7, wherein the device is embodied such that the predetermined first threshold value or the predetermined second threshold value are only determined in dependence on the first variable if the first variable is greater than a predetermined third threshold value.

9. A method for detecting an end of a movement of a valve piston in a valve, which comprises the steps:

detecting a first variable being representative of an induced voltage induced by the movement of the valve piston in a coil of the valve;

determining a second variable being representative of a first derivation of the first variable according to time; and detecting the end of the movement of the valve piston in the valve if the first variable is greater than a predetermined first threshold value and the second variable drops below a predetermined second threshold value.

10. The method according to claim 9, which further comprises determining at least one of the predetermined first threshold value and the predetermined second threshold value in dependence on the first variable.

11. The method according to claim 9, which further comprises determining one of the predetermined first threshold value and the predetermined second threshold value in dependence on the first variable if the first variable is greater than a predetermined third threshold value.

12. A device for detecting an end of a movement of a valve piston in at least one valve, the device being connected to the least one valve, the device comprising:

means for detecting a first variable being representative of an induced voltage induced by the movement of the valve piston in a coil of the valve;

means for determining a second variable being representative of a first derivation of the first variable according to time; and means for detecting the end of the movement of the valve piston in the valve if the first variable is greater than a predetermined first threshold value and the second variable falls below a predetermined second threshold value.

13. A device for detecting an end of a movement of a valve piston in at least one valve, the device being connected to the least one valve, the device comprising:

a device input for receiving an induced voltage induced by the movement of the valve piston in a coil of the valve;

a first device coupled to said device input and detecting a first variable being representative of the induced voltage;

a second device coupled to said device input and determining a second variable being representative of a first derivation of the first variable according to time; and a third device for detecting the end of the movement of the valve piston in the valve if the first variable is greater than a predetermined first threshold value and the second variable falls below a predetermined second threshold value, said third device connected to said output of both said first and second devices.

14. The device according to claim 13, further comprising a low-pass filter connected between said device input and said first device.

15. The device according to claim 13, further comprising a first impedance converter having an input impedance being greater than an output impedance, said first impedance converter having an output and an input for receiving the induced voltage, said first impedance device connected between said device input and said first device; and wherein said second device having a second impedance converter with an input impedance being less than an output impedance, said second impedance converter having an output, an input and a series circuit connected to said input of said second impedance converter, said series circuit containing a resistor and a capacitor, said input of said second impedance converter connected to said output of said first impedance converter, the first variable being detectable at said output of said first impedance converter and the second variable being detectable at said output of said second impedance converter.

16. The device according to claim 15, wherein said second device containing a voltage divider having an input connected to said output of said second impedance device, said voltage divider electrically connected between a supply potential and a ground potential, said voltage divider having a series circuit containing at least three resistors and at which the predetermined first threshold value and predetermined second threshold value can be tapped off between two succeeding ones of said three resistors in each case, said voltage dividers having outputs connected to said first and second devices.

17. The device according to claim 16, wherein:

said first device contains a first comparator; and said second device contains a second comparator, each of said first and second comparators having an open-collector output, an inverting input, and a non-inverting input, the first variable being applied to said non-inverting input of said first comparator, the predetermined first threshold value being applied to said inverting input of said first comparator, the second variable being applied to said inverting input of said second comparator and the predetermined second threshold value being applied to said non-inverting input of said second comparator.

18. The device according to claim 17, further comprising a protective circuit disposed between said device input and said first impedance converter, said protective circuit having at least one diode and one resistor, said protective circuit embodied so that if an excessive supply voltage occurs at an input side said diode becomes conducting and a current flow through said diode is limited by said resistor.

19. The device according to claim 17, wherein said third device is an AND gate having inputs each connected to said open-collector output of said first and second comparators.

* * * * *